No. 717,761. PATENTED JAN. 6, 1903.
J. W. PRIDMORE & G. G. BARKER.
MACHINE FOR TESTING RAKE TEETH.
APPLICATION FILED SEPT. 18, 1902.
NO MODEL. 2 SHEETS—SHEET 1.
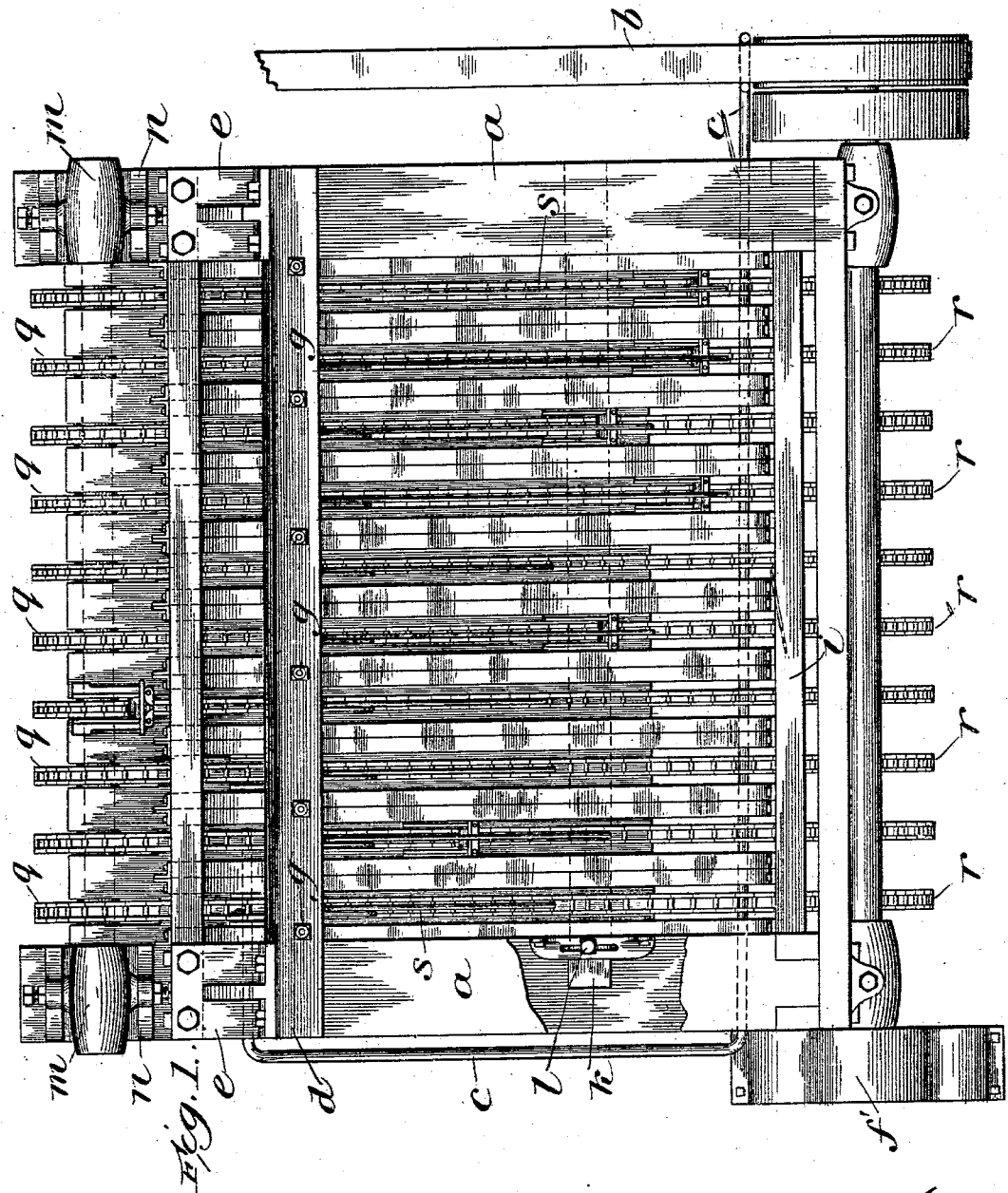

No. 717,761. PATENTED JAN. 6, 1903.
J. W. PRIDMORE & G. G. BARKER.
MACHINE FOR TESTING RAKE TEETH.
APPLICATION FILED SEPT. 18, 1902.
NO MODEL. 2 SHEETS—SHEET 2.
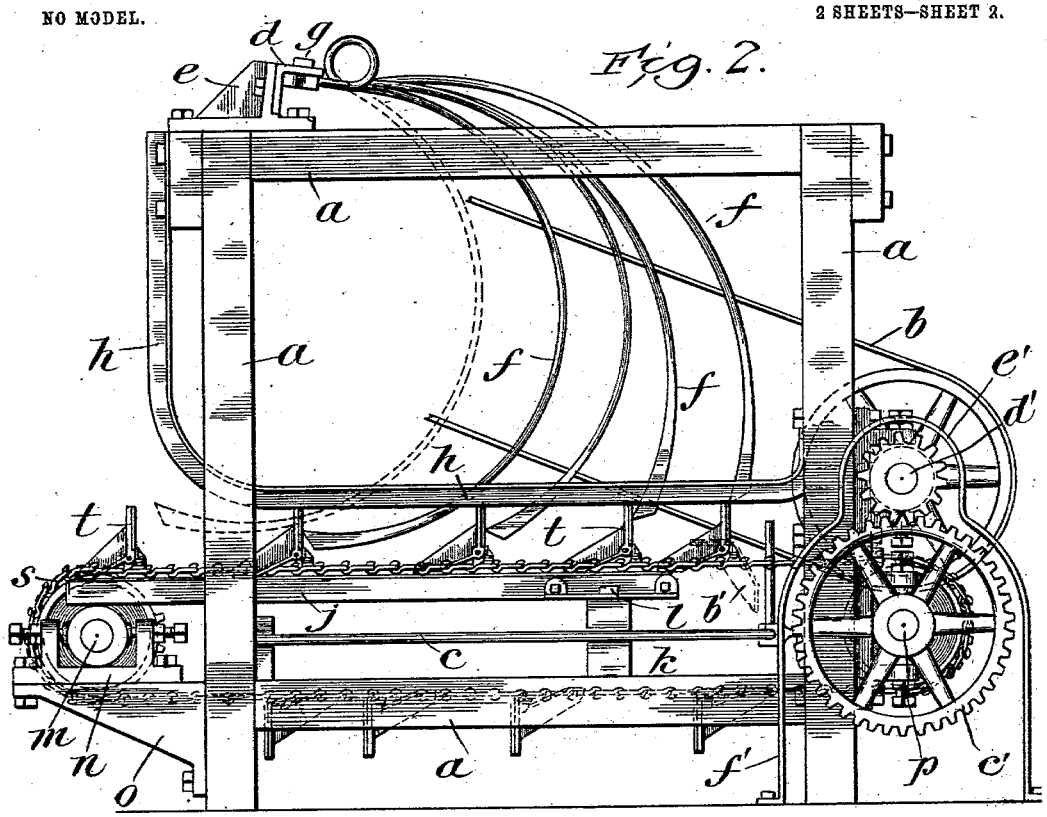
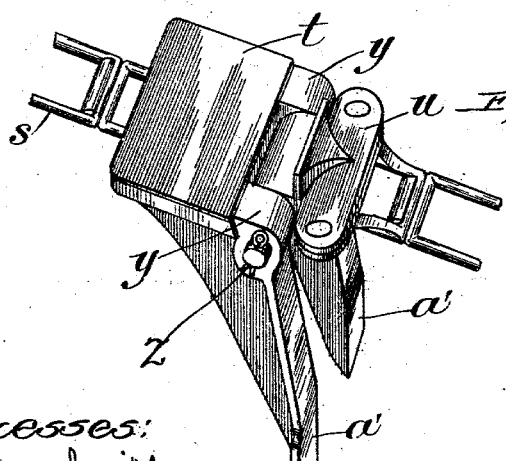
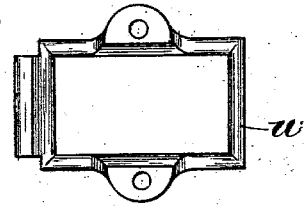
Witnesses:
W. Beall Williams.
Richard C. Cruit.
Inventors.
J. W. Pridmore
G. G. Barker,
By their attys.
Pennie & Goldsborough.

UNITED STATES PATENT OFFICE.

JOHN W. PRIDMORE AND GEORGE G. BARKER, OF CHICAGO, ILLINOIS, ASSIGNORS TO THE INTERNATIONAL HARVESTER COMPANY, OF CHICAGO, ILLINOIS, A CORPORATION OF NEW JERSEY.

MACHINE FOR TESTING RAKE-TEETH.

SPECIFICATION forming part of Letters Patent No. 717,761, dated January 6, 1903.

Application filed September 18, 1902. Serial No. 123,916. (No model.)

*To all whom it may concern:*

Be it known that we, JOHN W. PRIDMORE and GEORGE G. BARKER, citizens of the United States, residing at Chicago, in the county of Cook and State of Illinois, have invented certain new and useful Improvements in Machines for Testing Rake-Teeth; and we do hereby declare the following to be a full, clear, and exact description of the invention, such as will enable others skilled in the art to which it appertains to make and use the same.

The object of the invention is to provide a machine for testing rake-teeth, and especially the spring-teeth of horse hay-rakes, which will subject them as nearly as possible to the same strains that are incident to the practical operation of the rakes in the field.

To this end the machine comprises a stationary head, to which the teeth are temporarily secured at their upper ends and from which they depend as from the heads of the rakes themselves. The machine is also provided at the lower part with horizontally-moving chains, one for each tooth, which travel rearwardly over a table and carry at intervals upstanding blades or fingers which as the chains move rearwardly under the rake-teeth engage the ends of the teeth and bend them rearwardly in the same manner as they would be bent were the teeth themselves moving forward over a stationary surface, such as the ground, and engaging unyielding obstructions, such as stones, roots, &c.

The invention is illustrated in the accompanying drawings, wherein—

Figure 1 is a plan view of the machine. Fig. 2 is an end elevation of the same. Figs. 3, 4, and 5 are detail views of the chain and the contact devices carried thereby.

Referring to the views, *a a* denote the framework of a rectangular machine, which rests upon any suitable standards and is driven by a belt *b*, which is adapted to be shifted by a shipper *c* to and from the fast and loose pulleys (shown in Fig. 1) for the obvious purpose of starting and stopping the machine, as desired. Across the top of the machine a head *d* extends, this head being secured at opposite ends of the frame to brackets *e e*. The rake-teeth *f f*, that are to be tested, are secured at their upper ends at intervals along this head by means of bolts *g g* or by any means that may be found convenient or effective. From the front upper corner of the machine downwardly to nearly the lower ends of the teeth when in position there extend a plurality of bars *h*, which are bent rearwardly and thence horizontally and are preferably secured at their outer ends to a cross-bar *i*, fastened to the rear standards of the machine. These bars are suitably spaced apart to come between adjacent rake-teeth when in position to be tested and constitute guides to prevent the teeth from moving laterally while being tested and to hold them in the vertical planes of the traveling chains. At the lower part of the machine below the horizontal portions of the tooth-guides *h* there is a horizontal table *j*, extending transversely across the machine and supported by a cross-sill *k*, to which it is adjustably secured by a slotted bracket and bolt *l*, which permit it to be adjusted toward the front or rear of the machine in the direction of movement of the chains.

Referring to Figs. 1 and 2, *m* denotes a shaft which is adjustably journaled in pillow-blocks *n*, that are secured to brackets *o*, projecting forwardly from the front standards of the machine, and in correspondingly-adjustable supports at the rear side of the machine a similar shaft *p* is journaled. On these shafts *o* and *p* are secured a number of sprocket-wheels *q* and *r*, respectively, corresponding to the number of rake-teeth to be tested, and around these sprocket-wheels travel endless chains *s*, one for each rake-tooth. These chains travel over the table under the spaces between the tooth-guides *h*, and at intervals along their length they are provided with blades or fingers *t*, which project normally upward as the chains pass over the table *j* and contact with the lower ends of the rake-teeth in substantially the same manner as the teeth would contact with obstructions on the ground in the practical operation of the rakes in the field. The blades or fingers *t* are pivotally secured to clips *u*, that are attached to certain links *w* of the chains, the clips being provided with perforated lugs x, through which and into ears y on the blades the pintles z pass. The blades are provided with shoes or runners a', which project at right angles and which slide over the table as the chains travel rearwardly, and thus hold the blades in the vertical position. (Illustrated in Fig. 2.) When the chains reach the rear end of the table j, the blades or fingers, being no longer held upright by the shoes or runners a', turn downwardly into the position indicated by dotted lines b', Fig. 2, and immediately release the teeth, which then spring forwardly, as shown in dotted lines in Fig. 2, and finally return to their normal position, when they contact with one or another of the blades toward the front of the machine. The shaft p at the rear end of the machine has a large gear-wheel c' on the end opposite the driving-belt, and this shaft and the chain are driven at a comparatively slow rate of speed by means of a shaft d', having a driving-pinion e' on one end, which engages the gear c', and to the opposite end of which the driving-pulleys of the belt b are secured. The gearing is preferably housed and protected by a shield f', which is secured to the floor and extends upwardly over and around the gears e' and c'.

We believe ourselves to be the first to devise a machine for testing rake-teeth involving the general features above described—namely, a head to which the teeth are temporarily secured and a series of contacts which travel rearwardly and engage the lower ends of the teeth in a manner to subject them as nearly as possible to the same strains to which they would be subjected in the practical operation of the completed rakes in the field. We do not, therefore, desire or intend to be limited to the details of the construction herein illustrated or described, as the invention admits of considerable modification from these details without departing from its spirit or scope.

The operation of the machine will be fully understood from the above description, and it only remains to be noted in respect of the adjustment of the table that it provides for varying the amount of strain imposed upon the teeth and regulating the degree of tension to which they are subjected.

Having thus described our invention, what we claim, and desire to secure, is—

1. In a machine for testing rake-teeth, the combination of a head to which the teeth are secured at their upper ends, and a series of traveling contacts which engage the lower ends of the teeth and subject them to the same sort of strains that are incident to the operation of the rakes in the field.

2. In a machine for testing rake-teeth, the combination of a head to which the teeth are secured at their upper ends, and a series of rearwardly-traveling chains, one for each tooth, said chains carrying contacts which engage the lower ends of the teeth and subject them to rearwardly-bending strains analogous to those incident to the operation of the rakes in the field.

3. In a machine for testing rake-teeth, the combination of a head to which the teeth are secured at their upper ends, a series of rearwardly-traveling chains, one for each tooth, said chains carrying contacts which engage the lower ends of the teeth and subject them to rearwardly-bending strains analogous to those incident to the operation of the rakes in the field, and a table over which the chains and contacts travel, the contacts being pivoted to the chains so as to fold forwardly and release the teeth when the rear end of the table is reached.

4. In a machine for testing rake-teeth, the combination of a stationary head to which the upper ends of the teeth are secured, a table under the lower ends of the teeth, a series of chains traveling rearward over the table, and upstanding blades or fingers carried by the chains and contacting with the lower ends of the teeth as the chains travel, said blades being pivoted to the chains and having shoes or runners sliding on the table to hold the blades upright.

5. In a machine for testing rake-teeth, the combination of a stationary head to which the upper ends of the teeth are secured, a table under the lower ends of the teeth, a series of chains, one for each tooth, traveling rearwardly over the table, a series of guides to hold the teeth in the vertical planes of the chains, and upstanding blades or fingers carried by the chains and contacting with the lower ends of the teeth as the chains travel, said chains extending rearward beyond the table, and the blades being pivoted thereto so as to fold forward and release the teeth when the rear end of the table is reached.

6. In a machine for testing rake-teeth, the combination of a stationary head to which the upper ends of the teeth are secured, a table under the lower ends of the teeth, a series of chains, one for each tooth, traveling rearwardly over the table, a series of guides to hold the teeth in the vertical planes of the chains, and upstanding blades or fingers carried by the chains and contacting with the lower ends of the teeth as the chains travel, said chains extending rearward beyond the table, the blades being pivoted thereto so as to fold forward and release the teeth when the rear end of the table is reached, and the table being adjustable in the direction of the chains' travel so as to vary the point where the blades fold to release the teeth.

In testimony whereof we affix our signatures in presence of two witnesses.

JOHN W. PRIDMORE.
GEORGE G. BARKER.

Witnesses:
CHAS. N. CHAMBERS,
WM. WEBBER.